United States Patent [19]

Garrett

[11] 3,727,143

[45] Apr. 10, 1973

[54] INTEGRATING LEVEL SENSING CIRCUIT

[75] Inventor: B. Charles Garrett, Sepulveda, Calif.

[73] Assignee: Ampex Corporation, Redwood City, Calif.

[22] Filed: Dec. 6, 1971

[21] Appl. No.: 205,076

[52] U.S. Cl. ....................328/150, 307/235, 328/117

[51] Int. Cl. ....................H03k 5/20

[58] Field of Search....................307/228, 235; 328/115–117, 119, 127, 147, 150, 151

[56] References Cited

UNITED STATES PATENTS

| | | | |
|---|---|---|---|
| 2,986,655 | 5/1961 | Wiseman et al. | 307/235 X |
| 3,437,833 | 4/1969 | Razaitis et al. | 307/235 X |

*Primary Examiner*—John Zazworsky
*Attorney*—Robert G. Clay

[57] ABSTRACT

A circuit is provided for accepting valid data signals to the exclusion of unwanted signals of similar character which may result from improper recordings or from noise, in a digital data system employing magnetic recording. The data signal as derived from the recording is rectified and then integrated between each successive pair of zero crossings thereof. The results of each integration are compared with a reference signal of ramp waveform generated simultaneously therewith to selectively gate pulses corresponding to the zero crossings of a data signal of minimum acceptable amplitude to the output of the circuit to the exclusion of pulses produced by the zero crossings of noise or data signals of less than the minimum acceptable amplitude. Integration of the data signal reduces noise disturbance without attenuating the signal, and the use of a ramp signal rather than fixed threshold signals makes the circuit independent of frequency.

12 Claims, 3 Drawing Figures

INTEGRATING LEVEL SENSING CIRCUIT

BACKGROUND OF THE INVENTION

1. Field of the Invention

The present invention relates to data processing equipment, and more particularly to arrangements for sensing the level of a digital data signal to determine whether the signal represents valid binary data bits or invalid bits produced by noise or other unwanted signals.

2. History of the Prior Art

One of the most common methods of storing binary information is to encode the information into a data signal which is recorded on a magnetic medium such as a tape. When it is desired to retrieve the stored information the magnetic medium is made to undergo movement relative to a read head which senses the recorded data signal so that zero crossings or other indicia of the data signal as so sensed can be identified by decoding circuitry which detects the binary information. The magnetic recording medium is normally divided into a plurality of recording tracks. Data is selectively recorded in blocks along portions of the length of each track, the blocks being separated by unrecorded gaps such as inter- and intra-record gaps. During data processing operations the data recorded along part or all of a given track or tracks may be erased and other data recorded in its place.

Under ideal conditions recorded blocks of data are sensed by the read head as data signals of relatively large amplitude to the exclusion of the non-recorded gaps which induce virtually no signal at all in the read head. As a practical matter, however, portions of a previously erased recording may remain or other factors may combine to produce the sensing of an unwanted signal by the read head within the gaps of the magnetic recording medium. Conversely a valid data signal may be improperly recorded so as to provide a sensed signal of less than minimum acceptable amplitude during playback.

One technique commonly employed in an attempt to discriminate between valid data signals and signals which may be produced such as by noise in the inter-record gaps is to accept only those signals sensed by the read head which are at least equal to a minimum acceptable threshold value. Prior art circuits for accomplishing this typically employ DC threshold levels which are compared with the sensed data signal. However threshold signals are characteristically unreliable, among other reasons because they are subject to drift. Moreover noise present at or in the vicinity of the peaks of the data signals in systems of this type may produce a zero crossing detection which is displaced from the actual zero crossing of the data signal by as much as 30 percent of the length of a bit interval. Accordingly while level sensing circuits which employ DC thresholds may occasionally be satisfactory for some applications, such arrangements are generally unreliable and therefore undesirable for the reasons noted.

An alternative prior art technique for sensing the level of data signals derived from a magnetic recording involves filtering of the sensed signals. Such filtering substantially eliminates noise by passing but a single frequency, which frequency is chosen as the frequency of the recorded data. The difficulty with this approach is that the filters attenuate the data signal and must be changed each time the recording frequency is changed, resulting in a non-versatile system.

Accordingly it is an object of the present invention to provide an improved level sensing circuit which eliminates many of the problems present in prior art circuits.

A further object of the present invention is to provide an improved level detecting circuit which does not require filters or DC thresholds.

A still further object of the present invention is the provision of an improved level sensing circuit which is generally independent of frequency.

BRIEF DESCRIPTION OF THE INVENTION

Briefly, the present invention provides a level sensing circuit which compares signals sensed from a magnetic recording with a reference level in a fashion which is generally independent of frequency and which does not rely on DC threshold levels. Level detecting circuits in accordance with the invention rectify the data signal as sensed from a magnetic recording. Integration of the rectified data signal is commenced simultaneously with the generation of a signal of ramp waveform upon the occurrence of each zero crossing of the data signal. Upon the occurrence of the next zero crossing of the data signal the results of integration are compared with the ramp signal, and integration and ramp signal generation are again commenced. If the results of integration are at least equal to the reference level defined by the ramp signal at the time of comparison, pulses corresponding to the zero crossings of the data signal are passed to the output as valid data pulses. In the event the results of integration are less than the reference level, the pulses are blocked from the output to indicate that they represent either noise or an improperly recorded signal.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DETAILED DESCRIPTION

Figure 1:
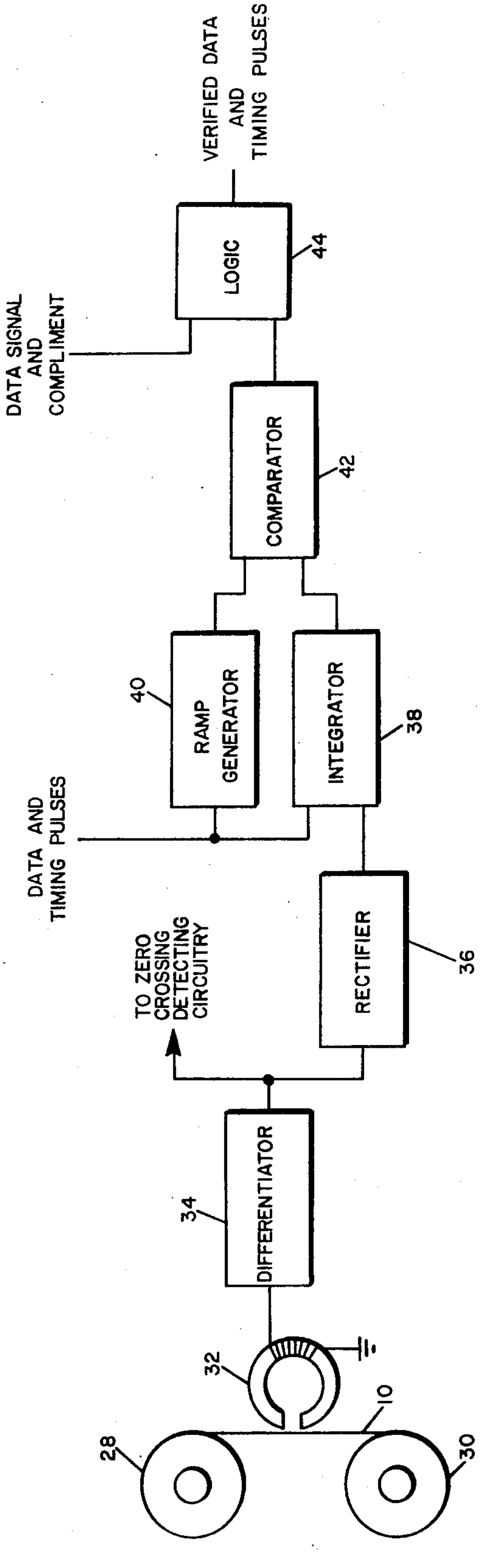
FIG. 1 is a block diagram of one preferred arrangement of an integrating level detecting circuit in accordance with the invention.
Figure 3:
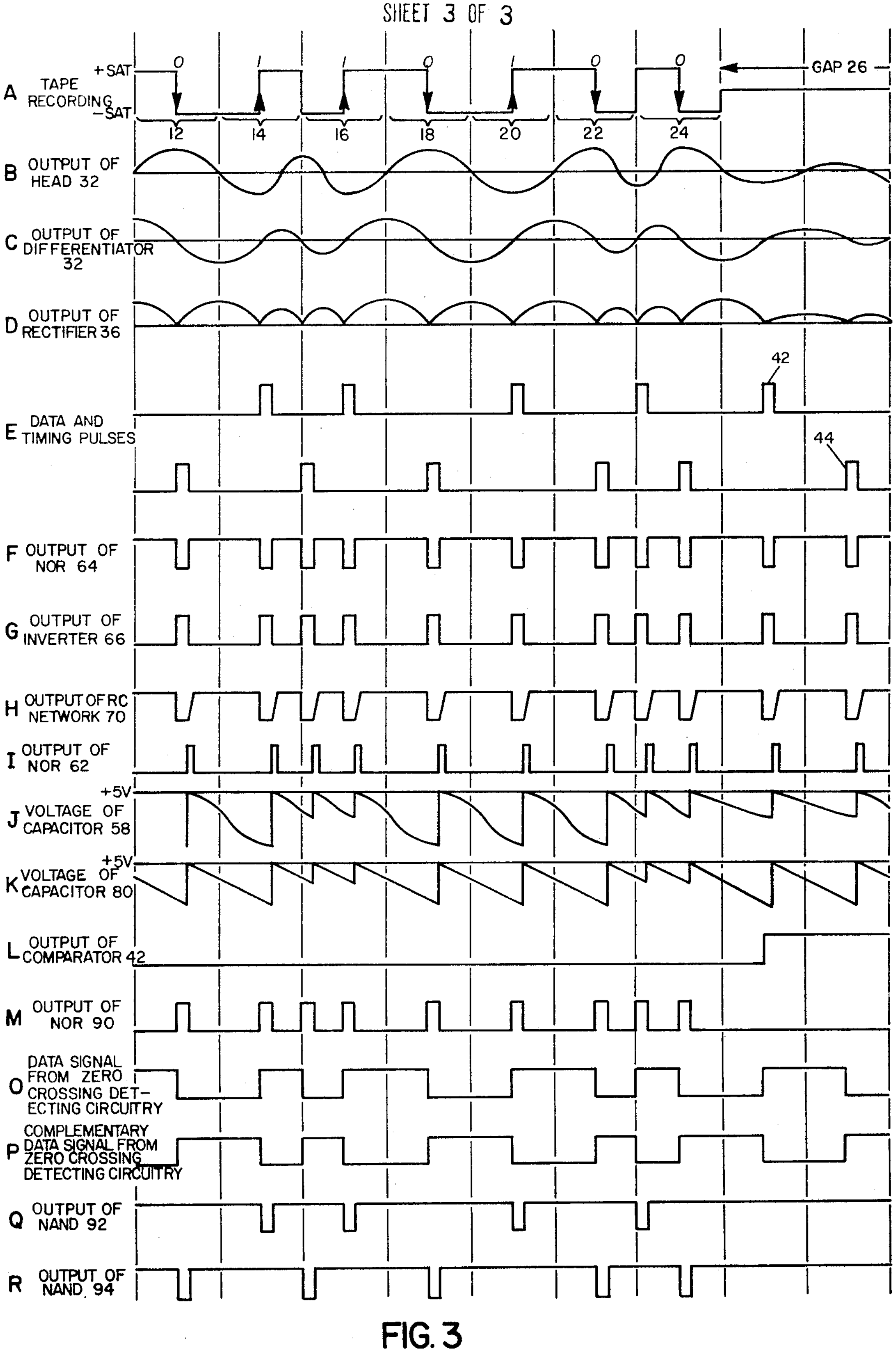
FIGS. 3A through 3R are waveforms useful in explaining the operation of the arrangements of FIGS. 1 and 2.

The particular arrangement shown in FIG. 1 detects the level of signals derived from a magnetic recording on a tape 10. The stored data may be encoded on the tape 10 in any appropriate fashion such as by use of phase encoding techniques as shown in FIG. 3A. The particular waveform of FIG. 3A represents a magnetic recording on the tape comprising transitions between opposite positive and negative levels of magnetic saturation. The length of the magnetic recording is arbitrarily divided into a succession of bit cell intervals of generally equal length. The first seven bit intervals shown in FIG. 3 comprise intervals 12, 14, 16, 18, 20, 22 and 24 in which binary data is recorded. The bit interval 24 is followed by a gap 26 in which no data is recorded.

In the case of the phase encoding depicted in FIG. 3A the magnetic recording comprises a transition through zero at the center of each bit interval as well as a transition at the leading edge of selected intervals. The sense or direction of the zero crossings at the centers of the various bit intervals represent the data stored therein. Thus the negative-going transition through zero represents "zero" as in the case of the intervals 12, 18, 22 and 24. The positive-going transitions on the other hand, such as occur in the intervals 14, 16 and 20, represent binary "one". The transitions at the leading edges of the bit intervals 16 and 24 are necessary reversals in the polarity of the recording so that transitions of the same sense can occur at the centers of successive bit intervals representing the same binary value.

The magnetic tape 10 shown in FIG. 1 is advanced between supply and takeup reels 28 and 30 past a magnetic read head 32. The head 32 responds to the relative movement of the tape 10 so as to differentiate the magnetic recording in well-known fashion. The differentiated signal at the head 32 resulting from the magnetic recording of FIG. 3A is illustrated in FIG. 3B. As is well known in the art the zero crossings of the magnetic recording may be restored by differentiating the signal sensed by the read head. Accordingly a differentiator 34 is coupled to the output of the read head 32 to reproduce the data signal as shown in FIG. 3C.

It should be understood by those skilled in the art that the invention is herein described in terms of the detection of data stored on a magnetic medium for purposes of illustration only. In actual practice the circuit of the invention may be used in conjunction with the detection of data which has been stored using other conventional techniques and data which has not been stored at all but which has been encoded for purposes of communication thereof. It will also be understood by those skilled in the art that phase encoding is described herein for purposes of illustration only, and that other types of encoding can be used in accordance with the invention.

Ideally the signal of FIG. 3B as derived by the read head 32 is of zero value throughout the gap 26 since the magnetic tape recording is at magnetic neutral or zero value during the gap. As a practical matter however, noise such as may result from a previous data signal which is not completely erased within the gap 26 may result in signals other than of constant zero value being sensed by the read head 32. Signals which may result from such noise in the gap 26 are shown in FIG. 3B with the corresponding signals at the output of the differentiator 34 being shown in FIG. 3C.

The signal at the output of the differentiator 34 as shown in FIG. 3C comprises the data signal as recorded on the tape 10. This signal is applied to detection circuitry for detecting the binary data bits represented thereby. Since phase encoding is used in the present example the data bits are detected by identifying the zero crossings in the data signal at the output of the differentiator 34. Accordingly as shown in FIG. 1 the output of the differentiator 34 is applied to zero crossing detecting circuitry which may, for example, comprise the circuit shown and described in a copending application of B. Charles Garret, Ser. No. 204,817, filed Dec. 6, 1971, entitled ZERO CROSSING DETECTING CIRCUIT, and commonly assigned with the present application. As described in that application the data signal at the output of the differentiator 34 is compared with a reference signal to identify each zero crossing, an associated bistable latch being switched each time a zero crossing occurs. The latch generates signals representing the data signal and its complement, which signals are used in the circuit of the present invention as described hereafter. The latch shown in the circuit of the copending application also functions in combination with an associated pulse generator to produce a pulse in response to each zero crossing. These data and timing pulses which are used to represent the data itself as well as to operate circuitry used in the identification of such data are also employed in the circuit of the present invention as described hereafter.

In accordance with the present invention the data signal at the output of the differentiator 34 is rectified by a rectifier 36 prior to being applied to an integrator 38. The rectified data signal of FIG. 3C is shown in FIG. 3D. The integrator 38 and a ramp generator 40 both respond to the data and timing pulses from the zero crossing detecting circuitry. The data and timing pulses which are shown in FIG. 3E identify each zero crossing of the data signal. In addition the two different trains of pulses include pulses 42 and 44 which result from the zero crossings of the noise within the gap 26. It will be noted that the data and timing pulses occur at least once each cycle of the data signal and in some cases at half cycle intervals of the data signal.

As described in detail hereafter the integrator 38 responds to each pulse to commence integrating the rectified data signal at the output of the rectifier 36 as shown in FIG. 3J. At the same time the ramp generator 40 responds to each pulse to commence the generation of a signal of ramp waveform shown in FIG. 3K. Upon occurrence of the next succeeding pulse the integration and generation of the ramp signal are both terminated so that the integrator 38 can begin a new integration and the ramp generator 40 can begin generating a new ramp signal. At this time a comparator 42 compares the results of integration with the ramp signal to determine which is the larger. The output of the ramp generator 40 comprises a reference level representing the minimum amplitude at which a data signal will be accepted as representing valid data and not noise. Accordingly if the data signal as integrated by the integrator 38 is larger than the ramp signal as determined by the comparator 42 a signal is provided to logic circuitry 44 enabling the circuitry 44 to provide verified data and timing pulses in response to the data signal and its complement from the zero crossing detecting circuitry. On the other hand if the data signal as integrated by the integrator 38 is less than the ramp signal as determined by the comparator 42 the logic circuitry 44 does not provide the verified data and timing pulses.

The output of the comparator 42 is shown in FIG. 3L, while the verified data and timing pulses at the output of the logic circuitry 44 are shown in FIGS. 3Q and 3R. The data signal and its complement from the zero crossing detecting circuitry are shown respectively in FIGS. 3O and 3P. As will be seen from the discussion to follow the various data and timing pulses from the zero crossing detecting circuitry as shown in FIG. 3E are reproduced in inverted form at the output of the logic circuitry 44 as shown in FIGS. 3Q and 3R. However the pulses 42 and 44 which result from noise are prevented from being reproduced at the output of the logic circuitry 44 in accordance with the invention.

The verified data and timing pulses at the output of the logic circuitry 44 supplement and are used in conjunction with the data and timing pulses produced by the zero crossing detecting circuitry to properly identify the data carried by the data signal. However in the case of a read-after-write operation in which the data is recorded on the tape and then read back to verify its accuracy, the verified data and timing pulses are themselves used to verify both the accuracy of the recorded data and the sufficiency of the signal strength.

Figure 2:
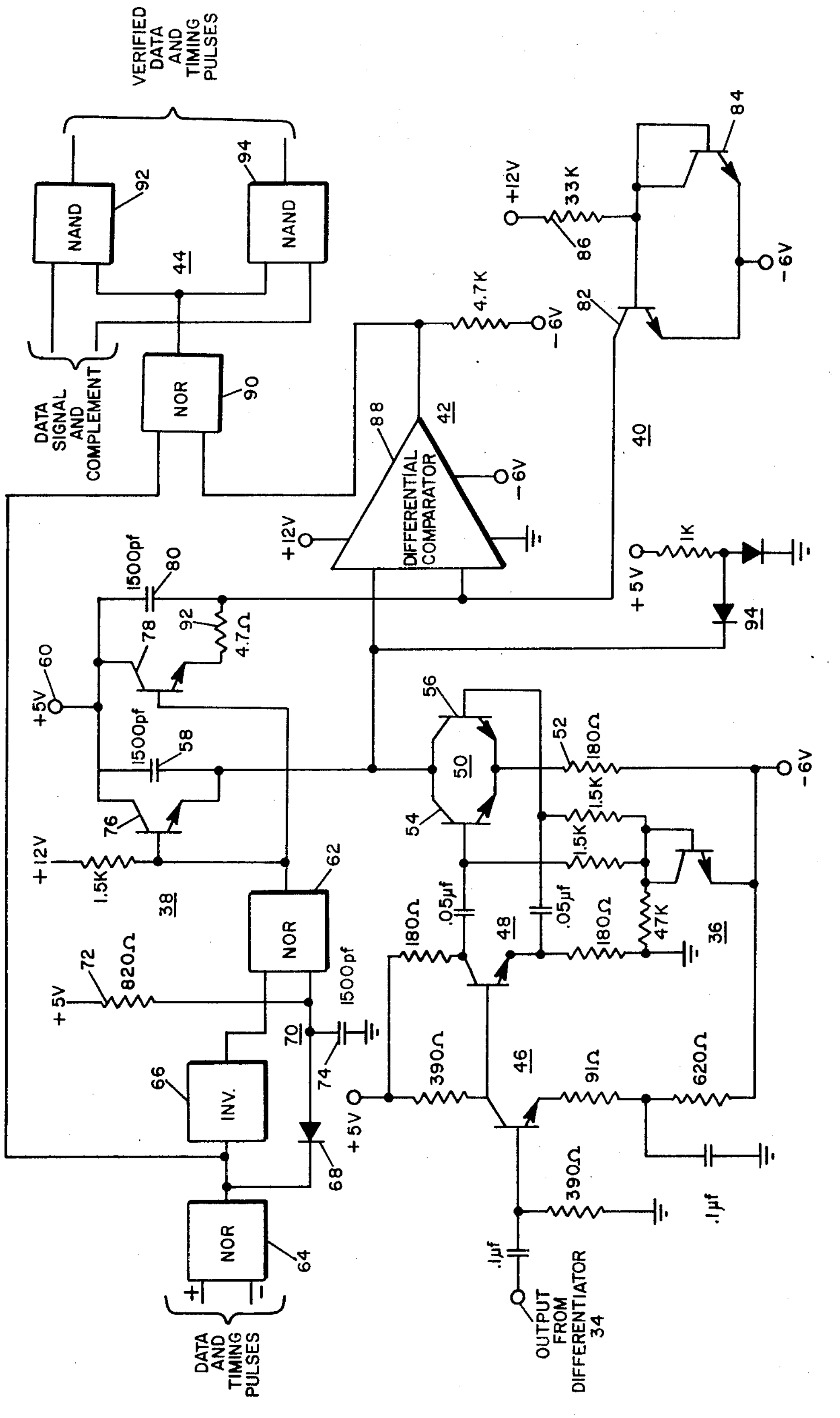
FIG. 2 is a schematic diagram of one preferred circuit for use in the arrangement of FIG. 1 in accordance with the invention.

One particular circuit for use as a part of the arrangement of FIG. 1 is schematically illustrated in FIG. 2. As seen in FIG. 2 the rectifier 36 includes an amplifier 46 and a phase splitter 48 as well as rectification circuitry 50. The amplifier 46 amplifies the data signal at the output of the differentiator 34 prior to passing such signal to the phase splitter 48. The phase splitter 48 and the rectification circuitry 50 operate in conventional fashion to produce the rectified data signal shown in FIG. 3D. The waveform of FIG. 3D comprises the voltage appearing at a resistor 52 which is coupled to the emitters of alternately conducting transistors 54 and 56 within the rectification circuitry 50. The waveform of FIG. 3D also represents the current which flows through a capacitor 58 between a positive power supply terminal 60 and the collectors of the transistors 54 and 56. The voltage across the capacitor 58, however, is the cosine function shown in FIG. 3J. This voltage results from the periodic charging and discharging of the capacitor 58 in response to a succession of spikes which appear at the output of a NOR gate 62 within the integrator 38 and which are shown in FIG. 3I.

The spikes of FIG. 3I are derived in response to the data and timing pulses shown in FIG. 3E which are received at the two different inputs of a NOR gate 64 from the zero crossing detecting circuitry. The NOR gate 64 produces an output shown in FIG. 3F in which the various data and timing pulses are effectively inverted and combined into a single pulse train. This signal is then inverted by an inverter 66 as shown in FIG. 3G prior to being applied to one of the inputs of the NOR gate 62. The output of the NOR gate 64 is also applied to a second input of the NOR gate 62 via a diode 68 and an RC network 70 comprising a resistor 72 and a capacitor 74. The RC network 70 delays the trailing edges of the inverted pulses at the output of the NOR gate 64 by a selected amount determined by the values of the resistor 72 and the capacitor 74 as shown in FIG. 3H. This signal is combined with the output of the inverter 66 in the NOR gate 62 to produce the spikes shown in FIG. 3I.

It will be noted that each of the spikes shown in FIG. 3I occurs at the trailing edge of a different one of the data and timing pulses. Upon the occurrence of each such spike a transistor 76 is turned on long enough to discharge the capacitor 58 as shown in FIG. 3J. At the same time a transistor 78 is turned on long enough to allow an associated capacitor 80 to discharge as shown in FIG. 3K. Thereafter the capacitor 58 integrates the rectified data signal by charging at a rate determined by the current which flows from the positive power supply terminal 60 through the rectification circuitry 50 as shown in FIG. 3J. At the same time the capacitor 80 generates the ramp waveform of FIG. 3K in conjunction with a precision current source comprising a transistor 82, a transistor 84 and a resistor 86 which charge the capacitor 80.

The voltages at the capacitors 58 and 80 seen respectively in FIGS. 3J and 3K are applied to the two different inputs of a differential comparator 88 within the comparator 42 to provide an output shown in FIG. 3L. The differential comparator 88 which may comprise a circuit sold under the designation "$\mu$A710C Dual Inline Package" by Fairchild Semiconductor Company compares the result of each integration as represented by the voltage on the capacitor 58 with the reference level represented by the voltage at the capacitor 80. The results of the comparison are applied to inputs of a NOR gate 90 together with the output of the NOR gate 64 within the logic circuitry 44. The NOR gate 90 effectively considers the results of the comparison at each succeeding zero crossing as denoted by the pulses at the output of the NOR gate 64. The output of the comparator 42 as shown in FIG. 3L is low when the integration voltage exceeds the ramp voltage and vice versa. Accordingly as seen in FIG. 3M the NOR gate 90 gates the data and timing pulses to its output under the control of the comparison. When the integration voltage exceeds the ramp voltage indicating that the valid data bits are present, the NOR gate 90 responds by gating the data and timing pulses to its output. On the other hand when the integration voltage is less than the ramp voltage the NOR gate 90 blocks data and timing pulses occurring during this time. A resistor 92 coupled between the emitter of the transistor 78 and the capacitor 80 delays the increase of the associated comparator input relative to the other comparator input during integration to prevent a base-emitter voltage drop in the transistor 78 which may be greater than the corresponding drop in the transistor 76 from inadvertently gating a spurious pulse to the output.

In accordance with one feature of the invention the level sensing circuitry thereof is generally independent of frequency. Thus as seen in FIG. 3J the integration voltage at the capacitor 58 continues to decrease with time until the occurrence of the next spike at the output of the NOR gate 62. At the same time however the reference voltage at the capacitor 80 which has a value directly proportional to the time distance between the adjacent zero crossings of the data signal and thus the time of integration of the data signal continues to decrease in linear fashion. Accordingly, even though the voltage at the capacitor 58 decreases by almost twice the amount in the case of a full cycle of integration as in the case of a half cycle of integration, the reference voltage at the capacitor 80 similarly decreases in proportion to the length of the interval over which integration is performed. Integration of the data signal thus produces a capacitor voltage which is related to the interval between successive zero crossings and is therefore independent of the frequency of the data signal. At the same time the reference voltage at the capacitor 80 being of ramp waveform is also proportional to the period of integration.

As seen in FIGS. 3J and 3K the integration voltage at the capacitor 58 is less than the reference voltage at the capacitor 80 during the first two integration intervals within the gap 26. This provides the comparator 42 with a high output as shown in FIG. 3L, and as previously noted the NOR gate 90 blocks the unwanted pulses 42 and 44 from appearing at the output thereof.

The output of the NOR gate 90 is coupled to one input of each of a pair of NAND gates 92 and 94 within the logic circuitry 44. The other input of the NAND gate 92 is coupled to receive the signal representing the true data signal from the zero crossing detecting circuitry. A second input of the NAND gate 94 is coupled to receive the complementary data signal from the zero crossing detecting circuitry. As seen in FIG. 3Q the NAND gate 92 reproduces the first train of data and timing pulses of FIG. 3E in inverted form and with the unwanted pulse 42 removed therefrom. Similarly the output of the NAND gate 94 as shown in FIG. 3R comprises the second train of data and timing pulses of FIG. 3E in inverted form and with the unwanted pulse 44 removed therefrom. The outputs of the NAND gates 92 and 94 thus comprise verified data and timing pulses.

A diode network 94 is coupled to the comparator input from the capacitor 58 to prevent that input from drifting below the other comparator input during a no-signal condition such as during the gap 26. This prevents the comparator 88 output from inadvertently dropping so as to possibly gate an unwanted pulse to the output.

While the invention has been particularly shown and described with reference to a preferred embodiment thereof, it will be understood by those skilled in the art that various changes in form and details may be made therein without departing from the spirit and scope of the invention.

What is claimed is:

1. In a system which provides signal indications of the occurrence of selected portions of a data signal to detect digital data represented thereby, a circuit for determining when the data signal is of at least minimum acceptable value comprising means responsive to said signal indications for integrating the data signal, means responsive to said signal indications for generating a reference signal having a value proportional to the time of integration of the data signal, means for comparing the integrated data signal with the reference signal, and means coupled to an output and responsive to the comparing means to produce said signal indications at the output except when the reference signal is larger than the integrated data signal.

2. The invention defined in claim 1, further including means for rectifying the data signal prior to integration thereof by the integrating means.

3. The invention defined in claim 1, wherein said signal indications are generated in response to zero crossings of the data signal, the integrating means integrates the data signal between the occurrences of each successive pair of said data signal indications, and the reference signal has a value proportional to the time distance between the occurrence of each successive pair of said signal indications.

4. The invention defined in claim 3, wherein the reference signal has a ramp waveform.

5. A level sensor for determining whether a data signal is of at least minimum acceptable value comprising:

means for periodically integrating the data signal;

means for generating a reference signal simultaneously with the integration of the data signal, the reference signal having a value bearing direct relation to the time of integration of the data signal; and means for comparing the integrated data signal with the reference signal to provide an indication whenever the reference signal is greater than the integrated data signal.

6. The invention defined in claim 5, wherein a signal is generated in response to each zero crossing of the data signal, the data signal is integrated between each successive pair of zero crossing signals, the reference signal has a value bearing direct relation to the time between each successive pair of zero crossing signals, and the comparing means compares the integrated signal with the reference signal upon the occurrence of each zero crossing signal.

7. The invention defined in claim 6, wherein the data signal comprises an alternating waveform, and further including means for rectifying the data signal prior to integration thereof.

8. The invention defined in claim 6, further including first gating means for gating the zero crossing signals to the output except when the comparing means provides an indication that the reference signal is greater than the integrated data signal, second gating means responsive to a true representation of the data signal for gating alternate ones of the zero crossing signals at the output of the first gating means to an output thereof, and third gating means responsive to a complementary representation of the data signal for gating the remaining alternate ones of the zero crossing signals at the output of the first gating means to an output thereof.

9. The invention defined in claim 6, wherein the reference signal generating means comprises a ramp generator which initiates generation of a reference signal of ramp waveform in response to each zero crossing signal.

10. The invention defined in claim 9, further including means for generating a pulse of selected duration in response to each zero crossing signal, wherein the integrating means includes a capacitor coupled to be charged by the data signal and to be discharged by each pulse of selected duration, and wherein the ramp generator includes a current source and a capacitor coupled to be charged by the current source and to be discharged by each pulse of selected duration.

11. An integrating level sensing circuit responsive to a data signal and to pulses representative of zero crossings of the data signal to provide the zero crossing pulses to an output except when the data signal is less than a minimum acceptable amplitude, comprising:

means for inverting the zero crossing pulses;

means for delaying the zero crossing pulses by a selected amount;

means responsive to the inverted zero crossing pulses and to the delayed zero crossing pulses for generating a series of spikes corresponding to time differences therebetween;

first and second capacitors coupled to be discharged to a common value by each of the series of spikes;

means for rectifying the data signal;

means coupling the rectified data signal to charge the first capacitor;

constant current means;

means coupling the constant current means to charge the second capacitor, the charge on the second capacitor defining said minimum acceptable amplitude of the data signal;

means for comparing the charges of the first and second capacitors; and means for gating the zero crossing pulses to the output except when the charge on the second capacitor is greater than the charge on the first capacitor.

12. The invention defined in claim 11, wherein the zero crossing pulses alternate between two different pulse trains, and further including means for amplifying and phase splitting the data signal prior to rectification thereof, and means coupled to the output for separating the zero crossing pulses thereat into the two different pulse trains comprising first gating means for gating the zero crossing pulses to an output thereof under the control of a representation of the data signal and second gating means for gating the zero crossing pulses to an output thereof under the control of a representation of the complement of the data signal.

* * * * *